June 27, 1972  S. R. BROWN  3,672,949
ADHESIVELY LAMINATED CREPED TISSUE PRODUCT
Filed Jan. 12, 1970  2 Sheets-Sheet 1

INVENTOR
STIRLING ROBERT BROWN

June 27, 1972  S. R. BROWN  3,672,949
ADHESIVELY LAMINATED CREPED TISSUE PRODUCT
Filed Jan. 12, 1970  2 Sheets-Sheet 2

INVENTOR
STIRLING ROBERT BROWN

BY
Anderson, Luedeka, Fitch, Even & Tabin
Attys

United States Patent Office 3,672,949
Patented June 27, 1972

3,672,949
ADHESIVELY LAMINATED CREPED TISSUE PRODUCT
Stirling Robert Brown, Oxnard, Calif., assignor to International Paper Company, New York, N.Y.
Filed Jan. 12, 1970, Ser. No. 2,134
Int. Cl. B32b 3/28
U.S. Cl. 161—129                                   8 Claims

ABSTRACT OF THE DISCLOSURE

A laminated tissue product as for paper toweling is formed from at least two creped tissue webs bonded in superposed relation by adhesive disposed in patterned lines delineating substantial unbonded regions. Each of the webs is embossed to produce raised portions extending from one surface thereof, and the raised portions of one web oppose respective raised portions of the other web. The raised portions are embossed in patterns assuring opposed relation of the respective raised portions and precluding any substantial nesting of the webs irrespective of the relative lateral disposition of the webs. The webs are joined under different respective tensions so that, upon relaxing, the webs are in different conditions of stress, and one web is of greater area than the other.

---

This invention relates generally to laminated creped tissue products. More specifically, the invention relates to an adhesively laminated creped tissue product useful in paper towels and to a method for the manufacture of such material.

It has long been a problem of the art to produce paper web material which possesses the flexibility, strength, softness, absorptivity rate and moisture-retention capacity found in textile fabrics.

One prior art process suggested laminated tissue as a substitute for woven fabrics. This process disclosed in U.S. Pat. No. 3,414,459, involved embossing two tissue webs with identical discrete protuberances and subsequently applying glue to only the distal ends of the protuberances, and by precision indexing, pressing the mating protuberances together to join the tissue webs into a laminated product. The laminate was subsequently calendered to reduce its thickness. This process had to be executed with extreme precision and care to assure precise mating of the protuberances with the proper degree of contact therebetween. Consequently, the process required slow speeds of web movement through the process equipment, resulting in high production costs. Further, the toweling product produced by this prior art process was lacking in flexibility and therefore was relatively stiff and harsh to the touch.

It is therefore an object of the present invention to provide a laminated tissue product having a high rate of absorbency and a large capacity to retain absorbed liquid. It is also an object to provide a laminated tissue sheet material which exhibits the softness, strength, bulk and drape normally associated with woven fabrics such as cloth. It is a further object to provide an economical method for producing a laminated tissue product which finds particular use as paper toweling.

Other objects and advantages of the invention will become known by reference to the following description and the accompanying drawings. In the drawings.

In general, the adhesively laminated creped tissue product of the present invention comprises at least two single ply, creped tissue webs, each having a dryer basis weight of between about 9 and 16 pounds per ream (2880 square feet) and a crepe ratio of from about 1.2 to 1.5 (uncreped length divided by creped length). Each of the webs is embossed to form raised portions abutting raised portions of the other web, and the webs are bonded together in superposed relation while under different conditions of stress by an adhesive disposed between the webs. It has been found that to obtain the best results the adhesive is preferably applied in a pattern of lines which define limited bonded regions delineating substantial unbonded regions in order to enhance the desirable physical characteristics of the product, namely, drape, softness, strength and absorptivity.

It has been found important to the present invention that each web include a surface, portions of which are raised with respect to other portions of the surface. In the preferred embodiment the raised portions of the respective surfaces are disposed in an all-over pattern; that is, the raised portions are distributed over substantially the entire area of each surface, such that, irrespective of the relative lateral disposition of the webs, when the webs are superposed, substantial parts of the raised portions of the respective webs are in opposing relation and abut. That is, registry of corresponding discrete protuberances is not required. It is not necessary that every raised portion of one web be in opposition to or abut a raised portion of the other web, rather it is necessary only that a sufficient number of raised portions abut, and that these raised portions be so spaced on each web surface, as to preclude nesting of the raised portions of one web in the space or spaces between the raised portions of the other web. With the preferred patterns of raised portions, there is no need for keeping the respective raised portions in registry, for if one web shifts laterally with respect to the other (i.e., translationally in the plane of the web in the machine or cross direction as distinguished from rotationally or in a direction normal to the plane of the web), the raised portions will nevertheless remain opposed or abutting. Nested webs create undesirably harsh and relatively inflexible products which also lack satisfactory bulk to make the product approach woven fabric as regards its physical characteristics.

Figure 1:
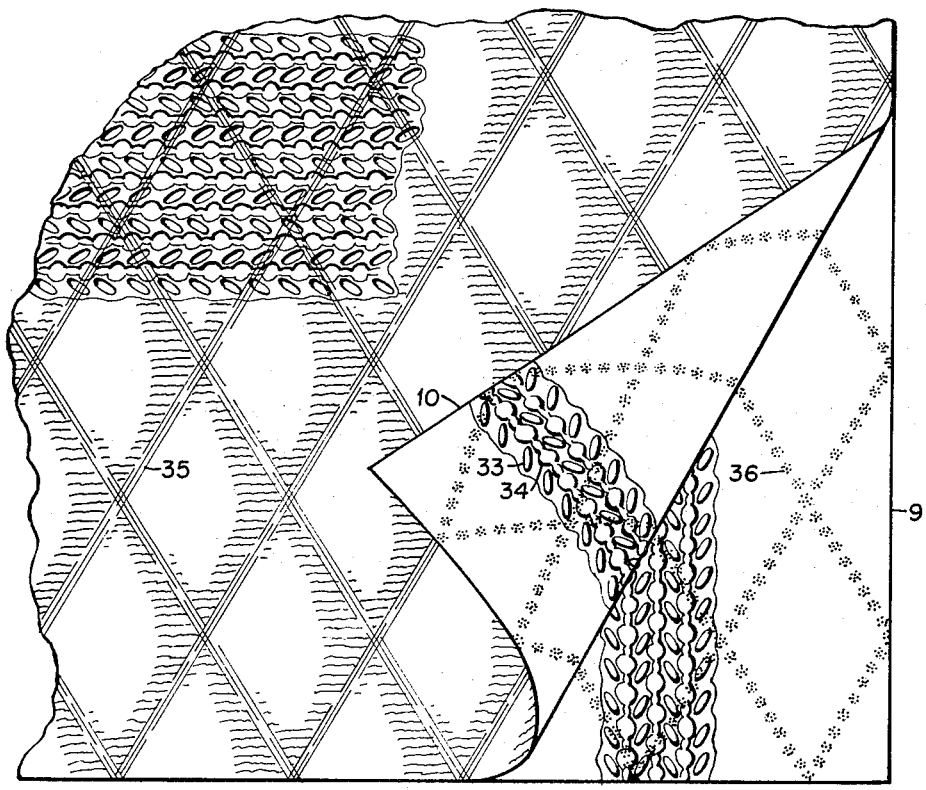
FIG. 1 is an illustration of one embodiment of the adhesively laminated creped tissue product of the present invention, showing one web of the laminated product turned back so as to make apparent the embossing and adhesive patterns of this embodiment and depicting only portions of the embossing patterns of the two webs.
Figure 3:
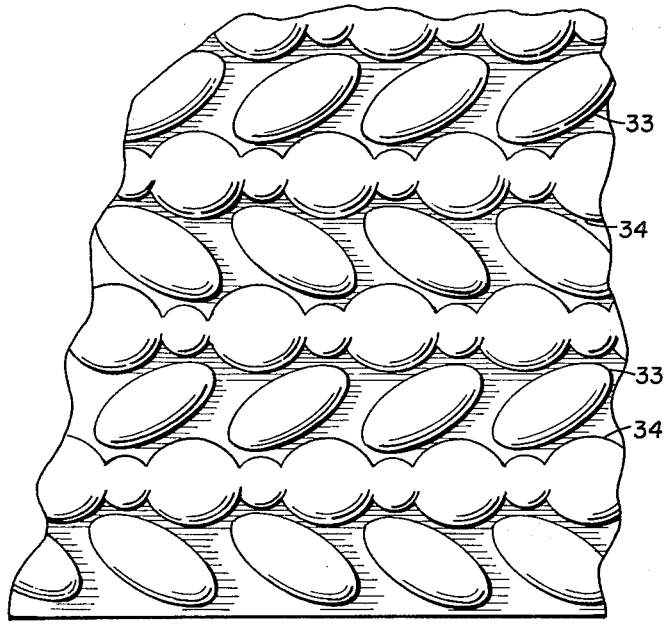
FIG. 3 is an illustration of one raised pattern on the embossing rolls employed to emboss the individual plies of the laminated product shown in FIG. 1.

One way of assuring non-nesting of the webs which has been found to be suitable comprises embossing one web with a pattern of embossments as shown in FIGS. 1 and 3 comprising a series of generally parallel, aligned, elongated raised portions 33 having a predominant alignment direction generally parallel to the longitudinal dimension of the web and separated by substantially parallel elongated portion 34. The other web is embossed with a pattern which includes a like series of parallel, aligned, elongated and separated raised portions. The latter pattern, however, is oriented predominantly perpendicularly to the pattern of the first web so as to assure abutment of the respective embossments when the webs are superposed with their respective embossments facing inwardly of the laminated webs.

Embossing, when practiced in accordance with the present invention, imparts bulk to the individual webs and increases the absorptivity of the resulting laminate. It has been found possible to produce an improved soft, absorptive, flexible product by laminating the embossed webs in a manner that minimizes destruction of the embossing, as will be discussed further hereinafter. It is noted that each web of the product of FIG. 1 is embossed over its entire surface, but in the figure, only portions of the embossing are shown.

It has also been discovered that the desirable properties of the web may be further enhanced by conditioning the webs to reduce physical contact between the webs in the unbonded areas. This result may be accomplished by elastically stretching one web to a greater extent than the other during the manufacturing process and relaxing the webs after they have been bonded into a laminated structure. Upon relaxation of the webs, the different degrees of web elongation cause one web to contract to a greater degree than the other web, leaving the webs in different conditions of stress and forcing that web which was stretched least to go slack, buckle in multiple folds and fall out of intimate contact with the other web within the unbonded regions. Because of their different degrees of contraction, the webs will be of different areas within the unbonded regions, that is, the web which is stretched to the greater extent has less area within each unbonded region than its overlaid counterpart. The desired web separation may be enhanced by disposing the web-to-web bond lines in direction extending obliquely to the machine direction of the webs. The results is a quilted or cushioned effect adding bulk to the product and forming a particularly soft product.

The plies of the present laminated product may be securely retained against delamination by spaced lines of adhesive, thereby assuring realization of the strength advantage attending an interlocked multiple-ply structure even under severe use conditions. For example, when the present product is used as paper toweling, the tissue webs neither delaminate nor tear improperly when torn away from a roll of perforated towels, as commonly occurs with prior art toweling. Within each unbonded region, the webs tend to compress toward each other when subjected to shear or impact forces. Such compression is resisted by the facing embossments and/or the slack web. Within each unbonded region this resistance acts as a cushion to absorb energy which would otherwise rupture the individual webs.

Further, the lines of bonding between the two webs constitute corridors of strength, the adhesive acting to bond the web fibers physically into a strong mass within the regions of bonding. Preferably, the lines of adhesive extend obliquely of the machine direction of the webs so as to establish intersecting or near-intersecting corridors of strength which roughly define diamond-shaped or circular patterns. These patterns have been found to impart good bi-directional strength to the laminated product, such corridors being especially effective in maintaining product strength when the product is bent, twisted, flexed or similarly manipulated during its use, for the webs would otherwise skew with respect to each other so as to reduce their cooperative contribution to the overall strength of the product. That is, the oriented corridors of strength aid in maintaining the unbonded portions of the web in their superposed strength-contributing attitude. The adhesive lines also have been found to provide a gentle hardening in limited areas which enhances the wiping capability of the laminated product without materially impairing its overall softness.

The individual creped webs of the present laminated product preferably comprise creped tissue prepared from sulfite pulp, each web having a basis weight between about 9 and 16 pounds (per 2880 square feet), and a crepe ratio of between about 1.2 and 1.5. Each web may exhibit an overall critical length of about 4.5 cm. (ASTM No. D 1388–64; 1" x 7" sample) and is preferably square as regards its strength. Wet strength-imparting resins, well-known in the art, may be added to the creped tissue to develop desired wet strength in the individual webs. Melamine resin added to the tissue in an amount of 0.5 to 1.0% has been found acceptable for general use toweling.

The two creped tissue webs are bonded in superposed relation to produce a laminated product. Bonding is effected by disposing an adhesive between the webs in accordance with a preselected pattern of application. The adhesive is preferably one of the synthetic resins. Polyvinyl alcohol in an aqueous medium has been found particularly desirable because of its fast rate of setting up, its compatibility with the tissue, and its intertness in the set-up state. A particular adhesive found suitable is 6% polyvinyl alcohol as prepared by mixing together 5 parts of polyvinyl alcohol sold under the trademark of Covol 9870, (distributed commercially by Corn Products Co., New York, N.Y.) with 80 parts of water, 1 part of wetting agent sold under the trademark of Triton X–100 (distributed commercially by Rohm & Haas Co., Philadelphia, Pa.) and 0.1 part of an antifoaming agent sold under the trade name of Antifoam B (distributed commercially by Rohm & Haas Co., Philadelphia, Pa.). The wetting agent is optional, but is preferred, in the mixture. Adhesive in discrete spots and more particularly in semi-continuous or continuous lines has been found to act as a dam against moisture movement within the plane of a laminated tissued product, thereby restricting the absorptivity of the product. This restrictive effect is reduced by adding the wetting agent to the adhesive prior to its application between the webs, for the resulting adhesive lines are then water permeable. The antifoaming agent reduces the foam build-up in the adhesive thereby decreasing the tendency of the adhesive to change in viscosity because of air entrapped in the mixture and avoiding the problem of containment of the foam during the application of the adhesive.

Figure 4:
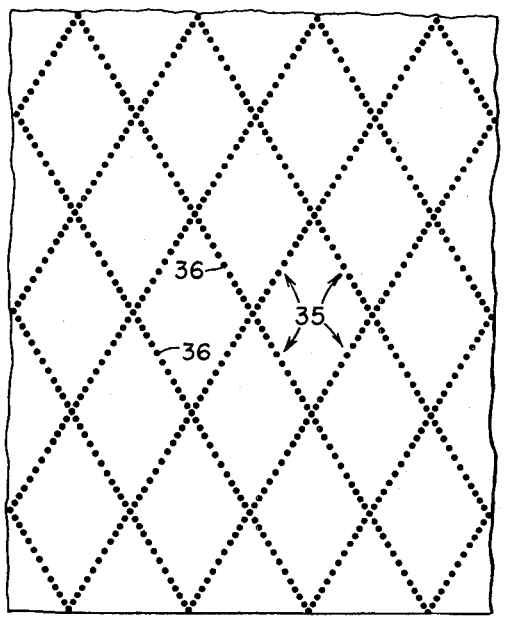
FIG. 4 depicts an adhesive pattern for use in producing the laminated paper product of this invention.
Figure 5:
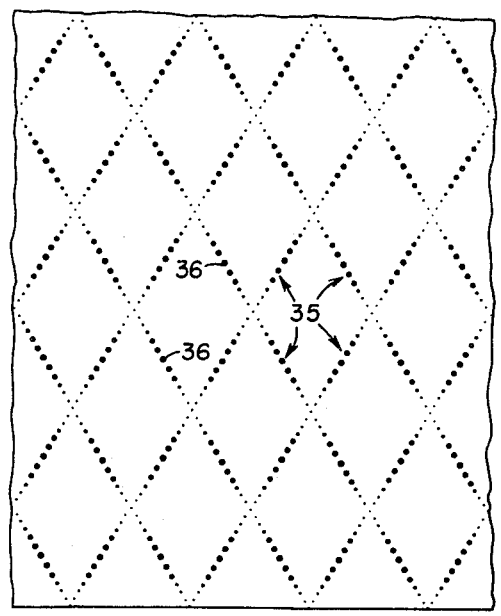
FIG. 5 depicts an alternative adhesive pattern for use in producing the laminated paper product of this invention.

The adhesive is preferably disposed between the webs in accordance with a pattern of lines 35 (FIGS. 1, 4, 5). These lines may be continuous or discontinuous or a combination of these. Preferably, the lines comprise a series of spots 36 as illustrated in FIG. 4. This further reduces the damming effects of the adhesive tending to isolate regions from fluid communication with other regions. That is, not only is the adhesive itself made water permeable, but the adhesive is disposed in separate spots. The spaced spots also produce a more flexible product that continuous lines of adhesive. In any event, the lines of adhesive are in a pattern wherein the lines form limited regions of bonding outlining substantial unbonded regions. The size of the respective unbonded areas between bond lines is great enough to permit the hereinbefore described separation of the webs within the unbonded region, thereby producing the desired quilted and bulking effects; yet it is not so great as to leave the webs substantially unbonded. Unbonded regions encompassing an area of at least about ½ square inch but less than about 3 square inches have been found satisfactory and are preferred.

The amount of adhesive applied should be sufficient to produce the desired adhesion of the individual webs without adding substantial stiffness to the resulting product. By concentrating the adhesive described above in lines of adhesive about .0625 inch in width with the above spacing, and applying about 0.0025 ounce of adhesive per square foot of product, the webs adhere sufficiently that fibers are pulled from the webs before the adhesive bonds break. As noted above, flexibility is improved by disposing the adhesive in discrete spots. Further, where the adhesive pattern is in intersecting lines of spots, it is preferable that the spots of adhesive be of different sizes, being smaller where there is a greater concentration of spots, as at the crossings of the lines as depicted in FIG. 5. This produces a more uniform flexibility in the product, as complete lines or spots of equal size are relatively stiff at the crossings of the lines.

In accordance with the embossing concept of the invention, effective separation of the superposed webs in the unbonded regions is achieved in part by embossments (or other like raised portions) which project from the web surface. Desirably, the embossments are of such design and distribution, e.g. an all-over pattern, as will assure that the webs are separated over substantially the entire unbonded area by about the combined heights of abutting embossments. Mild roughness of the outer surfaces of toweling enhances its wiping capability. Such surface texturing may be accomplished by choosing an all-over embossing pattern which creates a limited distribution of depressions on the outer web surfaces, the rims of the depressions imparting a woven appearance to the toweling. In use these rims scour the wiper surface and improve the cleaning capability of the toweling.

The shape, distribution and orientation of the embossments are preferably such that the embossments are relatively permanently set; that is they are not easily pulled out, as by stretching the webs or by winding the laminate in rolls.

Separation of the plied webs within the unbonded regions is achieved also by differentially stretching the two webs elastically prior to bonding them into the laminate, and relaxing the webs after bonding. Control of the tensions in the respective webs as they pass through the manufacturing apparatus provides a stretch in one web greater than that in the other web. While in this state, they are superposed with their lines of creping parallel and with adhesive disposed between them. After the adhesive has set up, the webs are relaxed from their stretched state. Both webs then contract, with the web which was stretched to the greater extent prior to bonding exhibiting a greater degree of contraction. This differential contraction causes buckling of the other web, frequently in multiple folds, and produces separation of the webs. The buckling and concomitant separation occur within each unbonded region and provide greater area to one web within each such region. Repetition of the effect over the entire laminated product gives the product a very pleasing feel and quilted appearance, as well as providing the strength advantage discussed hereinbefore.

The differential stretching of the webs not only adds bulk to the resulting laminate, but it provides a convenient way of controlling bulk. This makes it possible to produce a wide range of thickness for the laminate from a particular pair of individual webs. Changes in the embossing pattern also affect bulk, but the patterns are not changed so easily as tensions. For towel products, the laminate should be sufficiently thick to produce a roll about 5¾ inches in diameter when 130 sheets each 10 inches long are wound on a core about 1½ inches in diameter, irrespective of the basis weight of the individual webs, which is preferably relatively low for economical manufacture.

Figure 2:
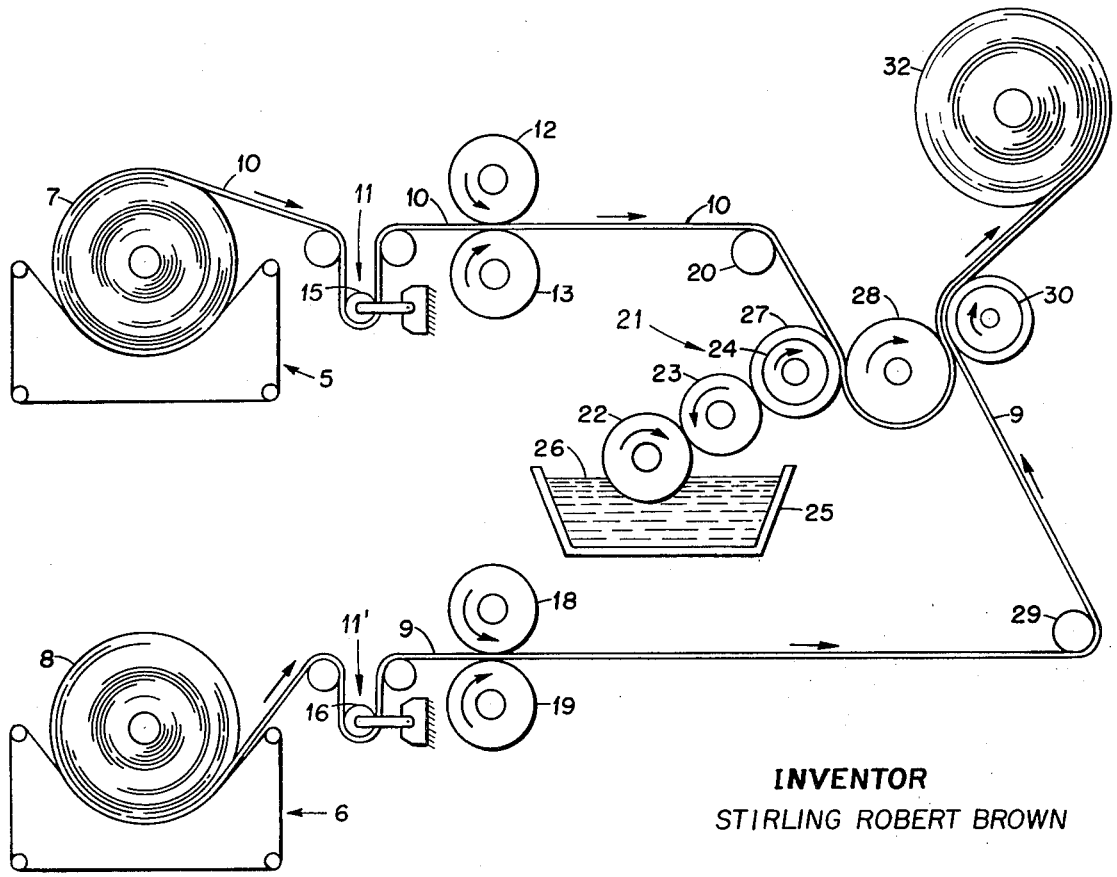
FIG. 2 is a representation of one embodiment of apparatus for producing the product shown in FIG. 1.

Referring to FIG. 2, apparatus for the manufacture of the present laminated toweling product includes a pair of unwind stands 5 and 6 designed to dispense continuous webs of creped tissue uniformly from respective rolls 7 and 8. Preferably, within the unwind stands the rolls of tissue are supported on continuous belts the movements of which turn rolls 7 and 8 at respective uniform speeds, thereby paying out continuous creped tissue webs 10 and 9, respectively, at respective uniform speeds.

Tissue webs 10 and 9 are dispensed from the rolls 7 and 8, respectively, and pass over separate sets of rolls 11, 11' to respective sets of embossing rolls 12, 13 and 18, 19. The respective roll sets 11, 11' may each include a tension roll 15, 16 to maintain a constant respective tension in webs 10 and 9.

Each set of embossing rolls comprises a steel embossing roll 12, 19 and a mating steel roll 13, 18. Each of the rolls 12 and 19 has its surface engraved with a pattern of projections, and each of the rolls 13 and 18 is provided with a respective mating pattern of depressions to receive such projections such that when a tissue web is passed through the nip between an embossing roll and its respective mating roll, the web is embossed with the pattern of the embossing roll.

The first web 10, upon exiting from between rolls 12 and 13 passes over an idler roll 20 to an adhesive laminating apparatus 21 which includes a fountain roll 22, a transfer roll 23 and a pattern or plate roll 24. The fountain roll 22 is partly immersed in a tank 25 of liquid adhesive 26. It rotates in the adhesive 26 and carries adhesive to the nip between rolls 22 and 23 where the adhesive is transferred in a metered amount to the transfer roll 23. The amount of adhesive transferred to the roll 23 is controlled by the pressure between the rolls 22 and 23. The pattern roll 24 is preferably constructed of steel and has a rubber impression mat 27 provided on its surface. The mat 27 has portions of its surface raised in accordance with a predetermined pattern. These raised surface portions contact the surface of transfer roll 23, thereby effecting transfer to the raised portions of the mat 27 of a controlled quantity of adhesive at such points of contact. The first web 10 is passed through the nip of the plate roll 24 with a smooth steel impression roll 28 in a direction transverse of the parallel lines of creping of the web 10. Adhesive is thereby laid down on the web in accordance with the pattern of raised portions on the pattern roll 24 in the form of an open pattern of lines defining limited bonding regions separated by relatively large adhesive-free regions. The adhesive-bearing tissue sheet 10 is trained around the impression roll 28, and simultaneously the second web 9, exiting from embossing rolls 18 and 19, is passed in a direction transverse of the parallel lines of creping of the web 9 around a guide roll 29 and overlaid on the web 10 with the patterned adhesive between the webs and with the lines of creping of the second web 9 parallel to the lines of creping of the first web 10. As the two sheets contact one another, a portion of the adhesive is transferred to the web 9. The two webs 9 and 10 with the patterned adhesive therebetween are then passed through the nip between the impression roll 28 and a second matching pattern or plate roll 30 having a pattern mat 31 corresponding to that of the pattern roll 24 and driven in registry with the pattern roll 24. As the webs 9 and 10 pass through the nip between the impression roll 28 and the second pattern roll 30, pressure is applied substantially only to the adhesive-bearing regions, forcing the adhesive which has become partially set up into good bonding relation in the two webs 9 and 10. The laminate may then be wound on a conventional winder 32 or passed to other process stations as desired, such as a printing unit for printing a design on the product.

In order that the webs of the resulting laminate may be in different conditions of stress during the laminating process, the webs 9, 10 are subjected to respective different tensioning forces transverse of the respective lines of creping in the plane of the respective webs. The tension applied to each sheet during its passage through the apparatus determines the degree to which the sheet is stretched at the time the sheets are bonded. The magnitude of this stretch is established by selective adjustment of the relative speeds of the unwind stands 5, 6, the sets of embossing rolls 12, 13 and 18, 19 and the rolls 28, 30 of the adhesive laminating apparatus 21. These individual rates of web travel are chosen so as to present the webs at their respective embossing stations under controlled conditions of tension and forward travel. The desired conditions of the webs may be achieved by unwinding each web and feeding it forwardly at a rate faster than the rate of passage of each such web through the nip of its respective set of embossing rolls. For example, it has been found that by unwinding one web at a rate which is about 1.8% faster than the rate of travel of such web through its embossing rolls, and unwinding the other web and feeding it forwardly at a rate of travel about 4.5% faster than it is passed through its respective embossing rolls, while simultaneously driving the embossing rolls for the latter web about 2% faster than the embossing rolls for the former web, both webs are presented to their respective sets of embossing rolls under respective appropriate conditions of slackness. As has been found in the present invention, by this means, at each embossing station there is provided sufficient web material to serve the two-fold objective of thorough embossing and subsequent controlled elastic stretching of the webs to different degrees of elongation.

The present invention further provides a means for controllably stretching the embossed webs to the desired different degrees of elongation as the webs are fed continuously forward to the laminating station. Specifically, it has been discovered that by driving one set of embossing rolls at a slower rate of rotation than that of the other set of embossing rolls, the web passing between the slower rolls becomes stretched more than the web passing between the faster rolls as the two webs are fed simultaneously to the nip of a pair of rolls in the laminating station.

EXAMPLE

Following the procedures set forth above, two separate webs of creped tissue paper, each 0.0034 inch thick and having a crepe ratio of 1.31, a dryer basis weight of 13.0 pounds (per ream 2880 square feet) and significant wet strength, were fed through separate sets of embossing rolls. Each set of rolls embossed a respective one of the tissue webs with a pattern of the kind depicted in FIG. 3. The raised portions on one web were oriented predominantly to cross the raised portions of the other web when the webs were superposed. The raised portions on each embossing roll extended to a height of about 0.023 inch from the surface of the roll. The two sets of embossing rolls were oppositely disposed such that the embossed raised portions of the two webs faced each other as they exited the embossing rolls. That is, embossing rolls 12 and 29, having raised portions thereon, were urged against the sides of the respective webs 10 and 9 that were on the outside of the laminate.

One of the embossed webs was directed through the nip between the impression roll 28 and the pattern roll 24 having its surface covered by a rubber impression mat 27 patterned as depicted in FIG. 4. The raised pattern of this mat extended to a height of 0.050 inch from the mat surface. Each spot in a pattern line was of 0.0625 inch diameter. In this example, 0.002 ounce of adhesive was transferred to each square foot of the first web 10 as it was passed between the impression roll 28 and the pattern roll 24. Polyvinyl alcohol dahesive in the formula described above was used. The viscosity of the adhesive as applied to the fountain roll 22 was 517 centipoises.

After the adhesive was applied to the first web 10, the second web 9 was overlaid on the web 10 with the respective raised portions of one web abutting those of the other web and with the patterned adhesive between the webs. The webs 9 and 10 with the adhesive therebetween were passed through the nip between the impression roll 28 and the matching pattern roll 30, where sufficient pressure was applied to force the partially set-up adhesive into bonding relation, hence joining the webs into a two-ply laminate. In this operation, the web 10 was unwound and fed to embossing rolls 12, 13 at 1000 feet per minute (f.p.m.), while the web 9 was fed to embossing rolls 18, 19 at 1008 f.p.m. Embossing rolls 18 and 19 were rotated at a speed such that web 9 was passed therethrough at 963 f.p.m. (4.5% slower than the web feed rate). Embossing rolls 12, 13 were rotated at a rate such that web 10 was passed therethrough at the rate of 982 f.p.m., (1.8% slower than the web feed rate). It is also noted that rolls 18, 19 were operated about 2% slower than rolls 12, 13.

Web 10 was maintained taut under a tension of about 2.18 lbs. per linear inch (p.l.i.) by roll 15. Web 9, under a tension of about 1.03 p.l.i., was maintained taut by roll 16.

The embossed webs were bonded into a laminate as they passed through the nip between rolls 28 and 30 at 999 f.p.m. This rate, being 3.7% faster than the web travel at embossing rolls 18, 19 and 1.7% faster than embossing rolls 12, 13 resulted in web 9 being stretched about 2% more than web 10.

After lamination the relaxed webs contracted to different degrees and produced a product having a thickness of about 0.009 inch in the unbonded areas, indicating an increase in bulkiness of about 0.0022 inch due to the treatment afforded the webs in accordance with the present method.

The product had a basis weight of 25 lbs. per ream of 2800 sq. ft. It was cut to width and divided into sheets by perforations and collected on rolls. One hundred thirty sheets each 10 inches long on a core 1½ inches in diameter formed a roll 5¾ inches in diameter.

The toweling so produced was tested for strength using a Hounsfield tensometer, 62½ lb. beam, and following TAPPI Standard No. T404ts–66 (10 plies). Its tensile strength was found to be 2.15 #/in. wide M.D.; 1.15 #/in. wide in C.D.

Critical length is a measure of the flexibility and softness of the product, hence is indicative of its ability to conform to the hand of a user and the wiped surface. Using a cantilever bending tester and ASTM No. D 1388–64 (except 1" x 7" sample), the present product exhibited critical lengths of 7.14 cm. in the machine direction and 6.01 cm. in the cross direction which indicates significantly greater flexibility than the flexibility of typical prior art toweling materials. Further, the product possessed a hand very similar to woven fabric.

The absorbency rate of the product was found to be about 2.4 seconds when measured in accordance with TAPPI Standard T432ts–64 and about 3.5 seconds when measured in accordance with a Canadian Government Specification Board 9–Gt–4a, Sec. 6.3.1 (except using 6" x 6" area).

Various modifications may be made within the scope of the invention. For example, the webs 9 and 10 may be passed through the adhesive laminating apparatus 21 in other paths. The web 10 may be passed through the nip between transfer roll 23 and the pattern roll 24, and the web 9 may be overlaid at the nip between the pattern roll 24 and the impression roll 28. Other patterns of embossing and adhesive may be used. Various features believed to be novel are included in the following claims.

What is claimed is:

1. An adhesively laminated creped tissue product consisting of at least two creped tissue webs of papermaking fibers each having embossments extending from a surface thereof and having substantially parallel lines of creping, said webs being superposed with the lines of creping of each of said webs substantially parallel to the lines of creping of the other, and adhesive disposed between said webs in a pattern bonding said webs together in limited regions disposed about substantial unbonded regions, a substantial number of the embossments of each web opposing respective embossments of the other of said webs in said unbonded regions, and each web being in a different condition of stress in the plane of the respective web in the direction substantially normal of the lines of creping.

2. A product according to claim 1 wherein the embossments of the respective webs are in patterns assuring opposing relation of the respective embossments and precluding any substantial nesting of the webs irrespective of the relative lateral disposition of the webs.

3. The product of claim 1 wherein one of said webs has a greater area than the other in each of said unbonded regions.

4. A product according to claim 1 wherein the pattern of said adhesive comprises aligned discrete spots.

5. A product according to claim 4 wherein the adhesive spots are smaller in regions of relatively greater concentration of spots.

6. A product according to claim 1 exhibiting a quilted appearance.

7. A product according to claim 1 wherein the thickness of the laminate is such that 130 sheets each 10 inches long wound on a 1½ inches diameter core produce a roll about 5¾ inches in diameter.

8. An adhesively laminated creped tissue product consisting of two creped tissue webs each having embossments extending from a surface thereof, each having a basis weight of about 9 to 16 pounds per 2880 square feet and creped with a crepe ratio of about 1.2 to 1.5 with substantially parallel lines of creping, said webs being superposed with the lines of creping of each web substantially parallel to the lines of creping of the other web, and adhesive disposed between said webs in a pattern bonding said webs together in limited regions disposed about substantial unbonded regions, a substantial number of the embossments of each web opposing respective embossments of the other in said unbonded regions, and each web being in a different condition of stress in the plane of the respective web in the direction substantially normal of the lines of creping.

References Cited

UNITED STATES PATENTS

| | | | |
|---|---|---|---|
| 3,214,323 | 10/1965 | Russel et al. | 156—291 |
| 3,025,199 | 3/1962 | Harwood | 161—85 |
| 3,377,224 | 4/1968 | Gresham et al. | 161—129 |
| 3,327,708 | 6/1967 | Sokolowski | 156—290 |
| 2,030,746 | 2/1936 | Galligan et al. | 161—76 |
| 3,047,445 | 7/1962 | Gresham | 161—129 |
| 3,316,136 | 4/1967 | Pufahl | 161—76 |
| 3,546,056 | 12/1970 | Thomas | 161—129 |

ROBERT F. BURNETT, Primary Examiner

L. KOECKERT, Assistant Examiner

U.S. Cl. X.R.

156—164, 199, 209, 291; 161—146, 148